US011500623B2

(12) United States Patent
Owen et al.

(10) Patent No.: US 11,500,623 B2
(45) Date of Patent: Nov. 15, 2022

(54) REVERTING MERGES ACROSS BRANCHES

(71) Applicant: Microsoft Technology Licensing, LLC, Redmond, WA (US)

(72) Inventors: Nathan Cole Owen, Seattle, WA (US); Deepraj Dixit, Hyderabad (IN); Manni Arora, Sonipat (IN); Harsh Sharma, Bhopal (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 17/156,114

(22) Filed: Jan. 22, 2021

(65) Prior Publication Data

US 2022/0236974 A1 Jul. 28, 2022

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS

| | | | |
|---|---|---|---|
| 5,649,200 A | 7/1997 | Jabs et al. | |
| 7,590,669 B2 | 9/2009 | Yip et al. | |
| 7,661,028 B2 | 2/2010 | Erofeev | |
| 8,381,176 B1 | 2/2013 | Bentley et al. | |
| 9,355,016 B2 | 5/2016 | Baril et al. | |
| 9,430,229 B1* | 8/2016 | Van Zijst | G06F 9/3844 |
| 9,921,948 B2 | 3/2018 | Zieder et al. | |
| 2008/0276260 A1 | 11/2008 | Garlick et al. | |
| 2014/0157245 A1 | 6/2014 | Krueger | |
| 2014/0282400 A1* | 9/2014 | Moorthi | G06F 9/45558 717/122 |
| 2014/0297592 A1* | 10/2014 | Ohtake | G06F 16/219 707/638 |
| 2014/0344557 A1* | 11/2014 | Bartlow | G05B 19/0426 712/236 |
| 2014/0372983 A1 | 12/2014 | Presley et al. | |
| 2017/0010889 A1* | 1/2017 | Spektor | G06F 8/71 |

(Continued)

OTHER PUBLICATIONS

"Git", Retrieved From: https://web.archive.org/web/20200418073942/https:/en.wikipedia.org/wiki/Git, Apr. 18, 2020, 20 Pages.

(Continued)

*Primary Examiner* — Daxin Wu
(74) *Attorney, Agent, or Firm* — Schwegman Lundberg & Woessner, P.A.

(57) ABSTRACT

A system for safely reverting merges across branches in version control systems where shared history cannot be rewritten is described. A computer-implemented method, comprising: identifying a first merge base at a trunk, the first merge base merging with a branch of the trunk; identifying, at the branch, a second merge base, subsequent to the first merge base, the second merge base merging with the trunk; forming a merge base patch branch from the branch at the second merge base, the merge base patch branch including a copy of the first merge base; merging the merge base patch branch with the trunk; and merging the merge base patch branch with the branch.

20 Claims, 9 Drawing Sheets

(56) References Cited

U.S. PATENT DOCUMENTS

| | | | |
|---|---|---|---|
| 2018/0081794 A1 | 3/2018 | Ramdas | |
| 2018/0150294 A1* | 5/2018 | Phillips | G06F 8/71 |
| 2019/0073230 A1 | 3/2019 | Ruder et al. | |
| 2020/0104120 A1 | 4/2020 | Speer et al. | |
| 2021/0255854 A1* | 8/2021 | Coscarelli | G06F 8/71 |
| 2021/0382709 A1* | 12/2021 | Sagal | G06F 8/71 |
| 2021/0406000 A1 | 12/2021 | Owen et al. | |

OTHER PUBLICATIONS

"GIT-Merge-Base Documentation", Retrieved From: https://git-scm.com/docs/git-merge-base, Retrieved on Dec. 31, 2020, 8 Pages.

"Source Code Control System", Retrieved From: https://web.archive.org/web/20200310021638/https:/en.wikipedia.org/wiki/Source_Code_Control_System, Mar. 10, 2020, 9 Pages.

"View and Manage Pull Requests", Retrieved From: https://docs.microsoft.com/en-us/azure/devops/repos/git/pull-requests?view=azure-devops, Aug. 28, 2020, 30 Pages.

Danielson, et al., "Choosing the Right Version Control for Your Project", Retrieved From: https://docs.microsoft.com/en-us/azure/devops/repos/tfvc/comparison-git-tfvc?view=azure-devops, May 12, 2017, 8 Pages.

Danielson, et al., "Review Code with Pull Requests", Retrieved From: https://web.archive.org/web/20200324131142/https://docs.microsoft.com/en-us/azure/devops/repos/git/pull-requests?view=azure-devops, Nov. 15, 2019, 47 Pages.

Danielson, et al., "Use Labels to Take a Snapshot of Your Files", Retrieved From: https://docs.microsoft.com/en-us/azure/devops/repos/tfvc/use-labels-take-snapshot-your-files?view=azure-devops, Aug. 10, 2016, 11 Pages.

"Version Control", Retrieved From: https://en.wikipedia.org/wiki/Version_control, Retrieved on Dec. 31, 2020, 10 Pages.

"Merge (Version Control)", Retrieved From: https://en.wikipedia.org/wiki/Merge_(version_control), Retrieved on Dec. 31, 2020, 4 Pages.

Oakley, et al., "Git", Retrieved From: https://github.com/git/git/blob/master/Documentation/howto/revert-a-faulty-merge.txt, Dec. 19, 2008, 6 Pages.

"Non Final Office Action Issued in U.S. Appl. No. 16/911,251", dated Jul. 9, 2021, 7 Pages.

"International Search Report and Written Opinion Issued in PCT Application No. PCT/US21/026499", dated Jul. 21, 2021, 11 Pages.

Storm, Tijs Van Der, "Backtracking Incremental Continuous Integration", In Proceedings of the 12th European Conference on Software Maintenance and Reengineering, Apr. 1, 2008, pp. 233-242.

"International Search Report and Written Opinion Issued in PCT Application No. PCT/US21/062735", dated Mar. 25, 2022, 11 Pages.

* cited by examiner

REVERTING MERGES ACROSS BRANCHES

TECHNICAL FIELD

The subject matter disclosed herein generally relates to a special-purpose machine that operates a data management system. Specifically, the present disclosure addresses systems and methods for safely reverting merges across existing branches in version control systems.

BACKGROUND

In a version control systems (VCS), branches of a version can be merged. The branches are divergent versions of the same content base (such as source code or documentation). After a merge has completed, a user may wish to revert, or undo, this merge in order to again separate the state of the branches to the way they were before the merge. However, current version control systems do not allow for shared history to be rewritten. Both of the branches can be re-used after the merge (e.g., both branches are referred to as "long-lived"). This undo operation can lead to unintended consequences upon the next merge of the two branches, (e.g., changes disappearing).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
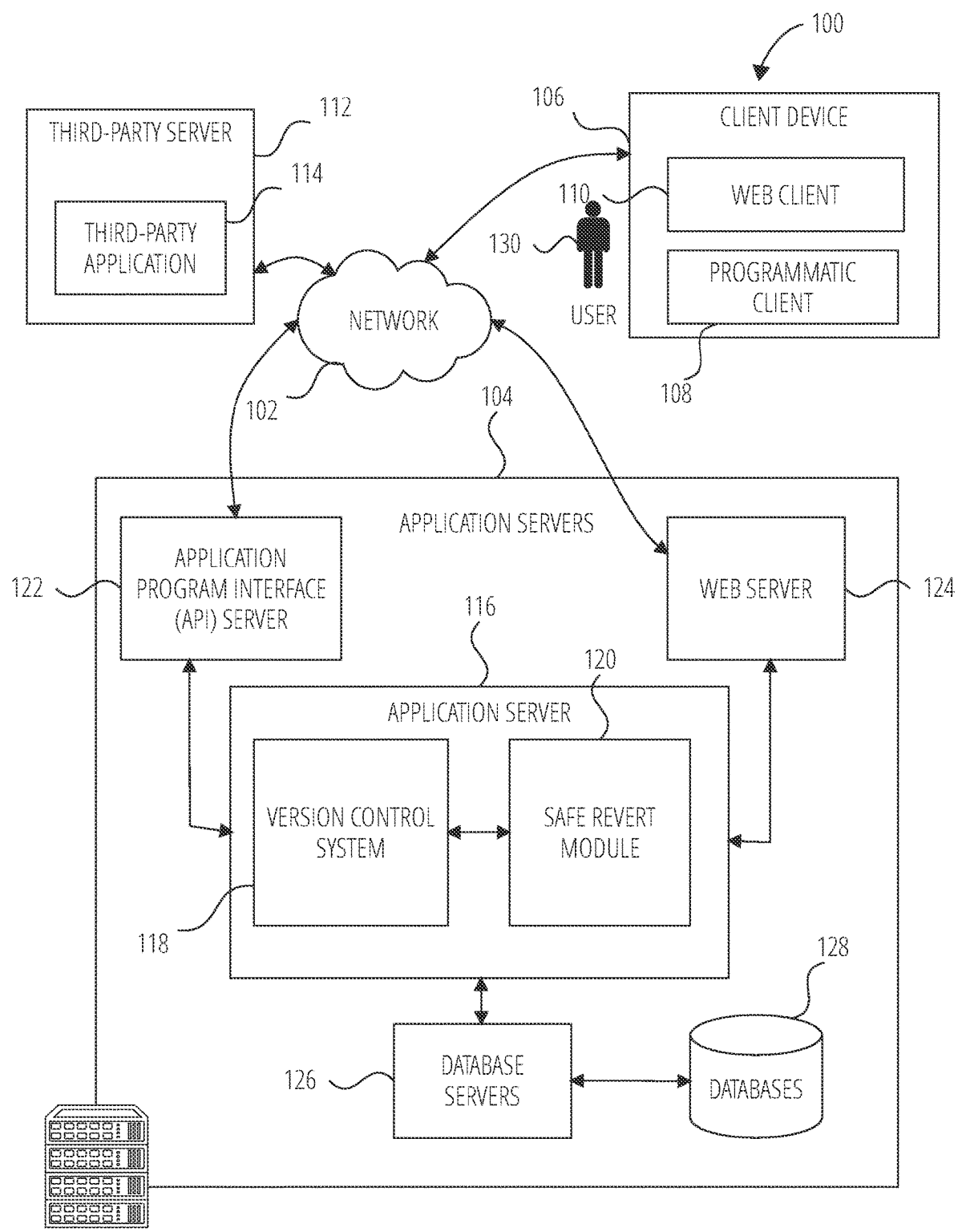
FIG. 1 is a diagrammatic representation of a networked environment in which the present disclosure may be deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

In a version control systems (VCS), branches are divergent versions of the same content base (such as source code or documentation). The branches can be merged. After a merge has completed, a user may wish to revert, or undo, this merge in order to again separate the state of the branches to the way they were before the merge. However, the VCS may not allow for shared history to be rewritten. Both branches can be re-used after the merge (e.g., both branches are "long-lived"). The undo operation can lead to unintended consequences upon the next merge of the two branches (e.g., changes suddenly disappearing).

The present application describes a solution to this problem by orchestrating an automatic revert of the merge which is immediately followed by a "patch" to the state of the version control system so that subsequent merges do not result in the aforementioned consequences. In one example embodiment, the present application describes an example of altering the version control "tree" or "DAG (Directed Acyclic Graph)" so that the next merge of these branches chooses a "valid" merge-base (e.g., the merge-base that was used for the very same merge that is being reverted).

Manually performing a revert of a merge without severe consequences can be difficult. As such, developers either avoid using long-lived branches, or avoid performing reverts of merges altogether. The present application describes a system that reverts merges under conditions that can be safely performed, automatically.

Example advantages of the present system include:
It can be implemented to perform automatically.
It requires no expertise beyond that of average version control system familiarity to perform.
It allows for a VCS architecture which broadly uses long-lived branches and does not allow shared history to be rewritten.
It eliminates the possibility of a revert unintentionally removing changes from branch from which the changes originated upon a subsequent merge—the most likely problem of a manual revert.

In one example embodiment, a system for safely reverting merges across branches in version control systems where shared history cannot be rewritten is described. A computer-implemented method, comprises: identifying a first merge base at a trunk, the first merge base merging with a branch of the trunk; identifying, at the branch, a second merge base, subsequent to the first merge base, the second merge base merging with the trunk; forming a merge base patch branch from the branch at the second merge base, the merge base patch branch including a copy of the first merge base; merging the merge base patch branch with the trunk; and merging the merge base patch branch with the branch.

As a result, one or more of the methodologies described herein facilitate solving the technical problem of efficiently accessing, updating, and storing data in a data storage device. As such, one or more of the methodologies described herein may obviate a need for certain efforts or computing resources that otherwise would be involved in data management systems that have been designed for data access patterns where information is written once and is read multiple times through the lifetime of the data set. As a result, resources used by one or more machines, databases, or devices (e.g., within the environment) may be reduced. Examples of such computing resources include Processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. The client device 106 includes a web client 110 (e.g., a browser), a programmatic client 108 (e.g., a software development application) that is hosted and executed on the client device 106.

An Application Program Interface (API) server 122 and a web server 124 provide respective programmatic and web interfaces to application servers 104. A specific application server 116 hosts a version control system 118, and a safe revert module 120. Each application may further include additional Components, modules, and applications.

The version control system 118 includes, for example, a system that records changes to a file or set of files over time so that specific versions can be later recalled later. The version control system 118 may also be referred to as revision control, source control, or source code management. The version control system 118 is responsible for managing changes to computer programs, documents, large web sites, or other collections of information. One example of version control is a Component of software configuration management.

Changes are usually identified by a number or letter code, termed the "revision number", "revision level", or simply "revision". For example, an initial set of files is "revision 1". When the first change is made, the resulting set is "revision 2", and so on. Each revision is associated with a timestamp and the person making the change. Revisions can be compared, restored, and with some types of files, merged.

The need for a logical way to organize and control revisions has existed for almost as long as writing has existed, but revision control became much more important, and complicated, when the era of computing began. Today, the most capable (as well as complex) revision control systems are those used in software development, where a team of people may concurrently make changes to the same files.

The version control system 118 are commonly run as stand-alone applications. In other examples, version control operations from the version control system 118 can be embedded in various types of software such as word Processors and spreadsheets, collaborative web docs and in various content management systems. Revision control allows for the ability to revert a document to a previous revision.

The safe revert module 120 provides a mechanism for safely reverting merges across long-lived branches in version control systems where shared history cannot be rewritten is described. In one example embodiment, the safe revert module 120 orchestrates an automatic revert of the merge which is immediately followed by a "patch" to the state of the version control system so that subsequent merges do not result in the aforementioned consequences. This is achieved primarily by altering the version control "tree" or "DAG (Directed Acyclic Graph)" so that the next merge of these branches will choose a "valid" merge-base (e.g., namely, the merge based that was used for the very same merge that is being reverted).

The version control system 118 and the safe revert module 120 communicate with the programmatic client 108 via the programmatic interface provided by the Application Program Interface (API) server 122. In another example, the version control system 118 and the safe revert module 120 communicate with the web client 110 via the web server 124.

The application server 116 is shown to be communicatively coupled to database servers 126 that facilitates access to an information storage repository or databases 128. In an example embodiment, the databases 128 include storage devices that store information to be processed by the version control system 118, and the safe revert module 120. In another example embodiment, the databases 128 include storage devices that store branch versions configured by the safe revert module 120.

The third-party application 114 stores a third-party application 114. The third-party application 114 executing on a third-party server 112 is shown as having programmatic access to the application server 116 via the programmatic interface provided by the Application Program Interface (API) server 122. For example, the third-party application 114, using information retrieved from the application server 116, may support one or more features or functions on a website hosted by the third party. In another example, the third-party server 112 may perform some of the functions of the safe revert module 120. In yet another example, the third-party application 114 may store the version control system 118 and the safe revert module 120.

Figure 2:
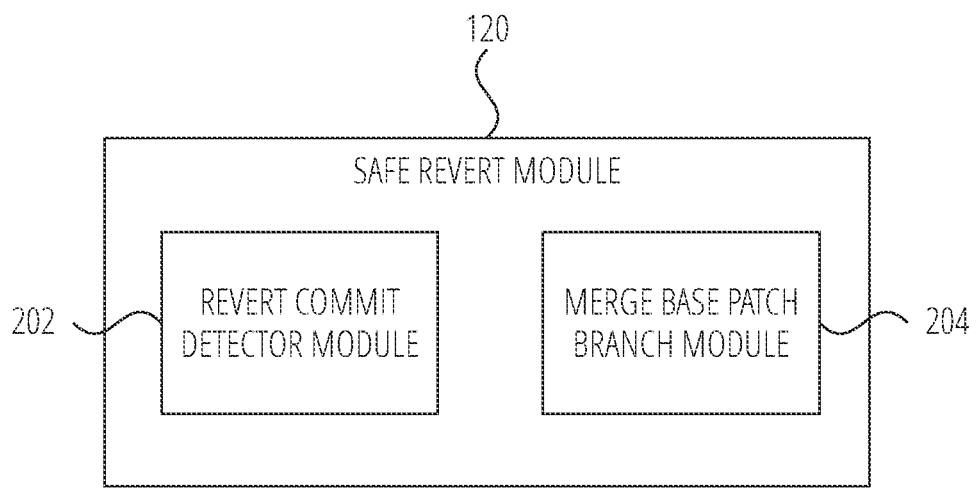
FIG. 2 is a block diagram illustrating a safe revert module in accordance with one example embodiment.

FIG. 2 is a block diagram illustrating the safe revert module 120 in accordance with one example embodiment. The safe revert module 120 includes a revert commit detector module 202 and a merge base patch branch module 204. The revert commit detector module 202 detects a revert commit operation on a trunk of a tree. For example, the revert commit detector module 202 detects that the merge of source code from a branch to a trunk of the tree. As previously described above, such operation can potentially hazardous should a break be detected in the trunk as a result of the merge.

The merge base patch branch module 204 forms a new branch off the branch of the trunk. The new branch may also be referred to as a new "merge base patch branch." A node of the merge base patch branch includes the same logic content as a previous merge base of the trunk. The operation of the merge base patch branch module 204 is described in more detail below with respect to FIG. 3 and FIG. 4.

Figure 3:
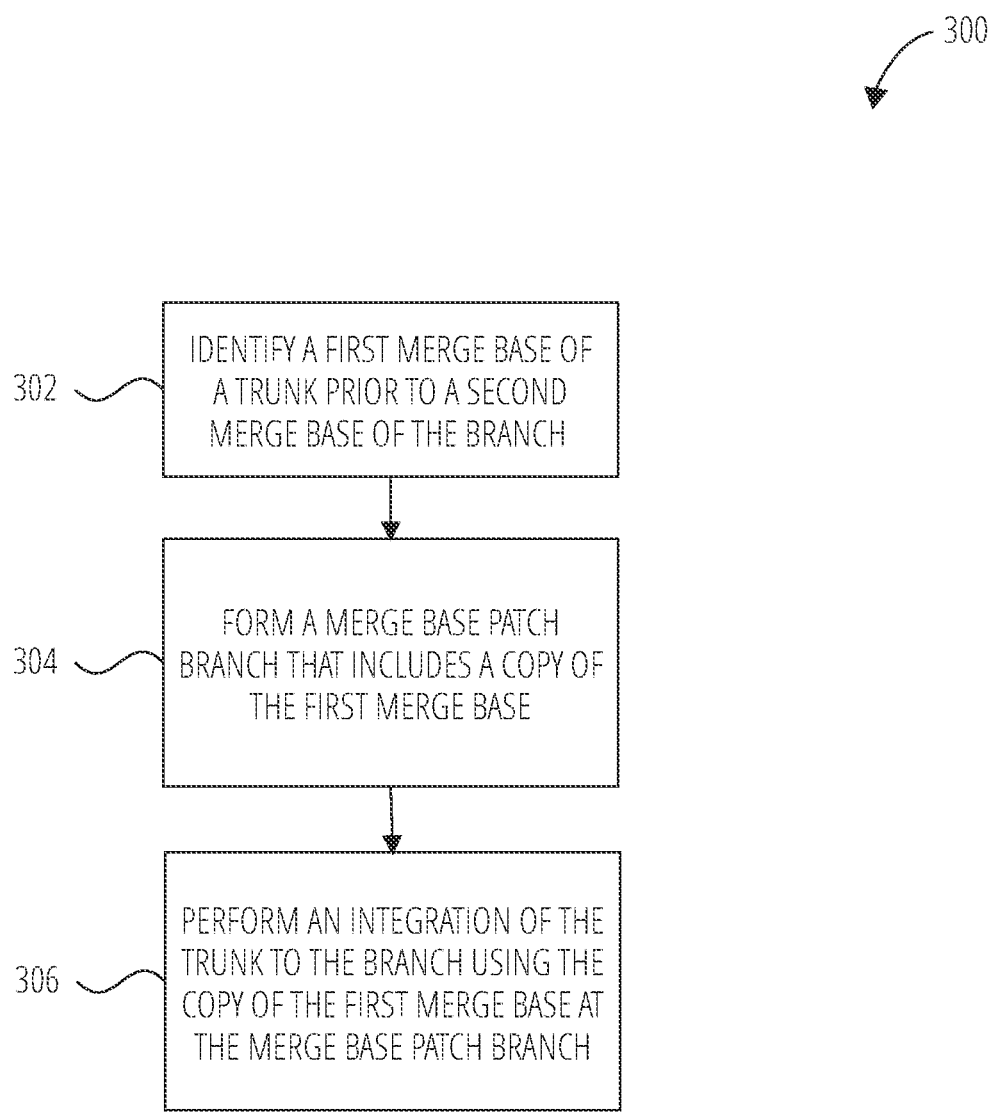
FIG. 3 illustrates a flow diagram of a method for forming a merge base patch branch in accordance with one example embodiment.

FIG. 3 illustrates a flow diagram 300 in accordance with one example embodiment. Operations in the flow diagram 300 may be performed by the safe revert module 120 using Components (e.g., modules, engines) described above with respect to FIG. 1. Accordingly, the flow diagram 300 is described by way of example with reference to the safe revert module 120. However, it shall be appreciated that at least some of the operations of the flow diagram 300 may be deployed on various other hardware configurations or be performed by similar Components residing elsewhere.

In block 302, the safe revert module 120 identifies a first merge base of the trunk prior to a second merge base of the branch. In block 304, the safe revert module 120 forms a patch branch off the branch. The patch branch includes a copy of the first merge base. In block 306, the safe revert module 120 performs a merge of the trunk with the branch using the copy of the first merge based on the patch branch.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 4:
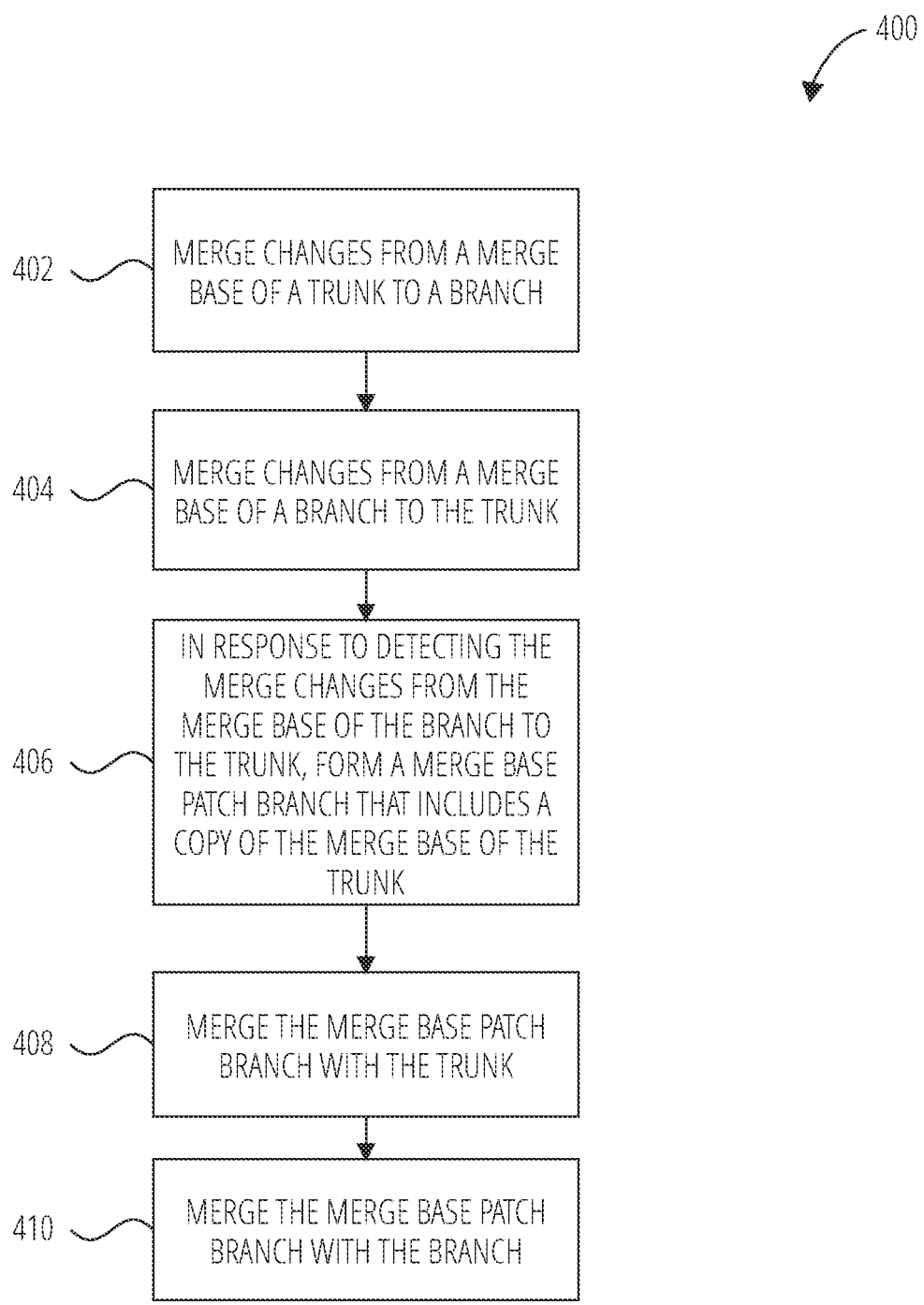
FIG. 4 illustrates a flow diagram of a method for safely reverting a merge in accordance with one example embodiment.

FIG. 4 illustrates a flow diagram 400 in accordance with one example embodiment. Operations in the flow diagram 400 may be performed by the safe revert module 120 using Components (e.g., modules, engines) described above with respect to FIG. 1. Accordingly, the flow diagram 400 is described by way of example with reference to the safe revert module 120. However, it shall be appreciated that at least some of the operations of the flow diagram 400 may be deployed on various other hardware configurations or be performed by similar Components residing elsewhere.

In block 402, the safe revert module 120 merges changes from a merge base of a trunk to a branch. In block 404, the safe revert module 120 merge changes from a merge base of a branch to the trunk. In block 406, in response to the revert commit detector module 202 detecting the merge changes from the merge base of the branch to the trunk, the merge base patch branch module 204 forms a merge base patch branch that includes a copy of the merge base of the trunk. In block 408, the merge base patch branch module 204 merges the merge base patch branch with the trunk. In block 410, the merge base patch branch module 204 merges the merge base patch branch with the branch.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 5:
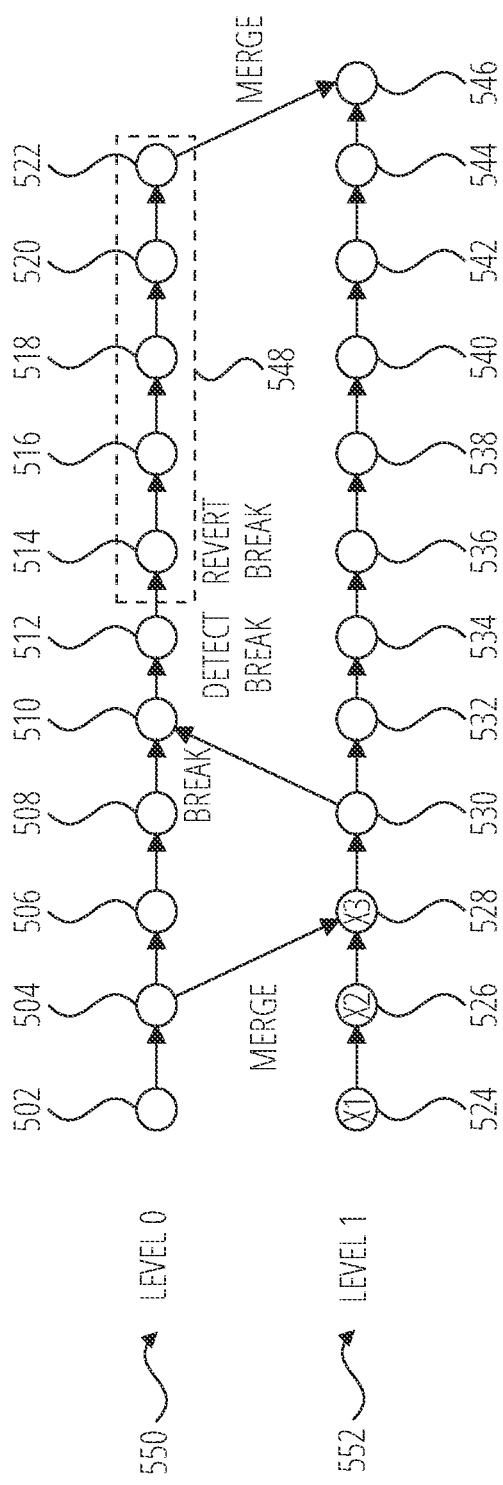
FIG. 5 illustrates an example of merges in accordance with one example embodiment.

FIG. 5 illustrates an example of merges in accordance with one example embodiment. Level 0 represents a trunk 550 of a tree. Level 1 represents a branch 552 of the tree. Each node of the tree represents a revision of a source code within the respective trunk 550 or branch 552. For example, the trunk 550 includes changes 502, 504, 506, 508, 510, 512, 514, 516, 518, 520, and 522 of an application. The branch 552 includes changes 524, 526, 528, 530, 532, 534, 536, 538, 540, 542, 544, and 546 of a sub-application of the application.

The source code from merge base 504 from the trunk 550 is merged with node 528 of the branch 552. The node 528 includes previous source code changes (e.g., revision x1 from node 524, revision x2 from node 526, and revision x3 from node 528) that are merged with source code from merge base 504.

The merge base 530 of the branch 552 merges back with node 510 resulting in a break (malfunction) of the source code at node 510. The break is detected at node 512. At node 514, a revert commit of the merge (from merge base 530 to node 510) is performed to remove the changes of merge base 530 to the trunk 550.

A danger zone 548 includes node 514, node 516, node 518, node 520, and parent 522. A merge from a node within the danger zone 548 (e.g., merge from parent 522 to node 546) could result in causing damages to the branch 552 because the revert commit at node 514 would unintentionally revert changes X1 of node 524, X2 of node 526, and X3 of node 528, as well as any other changes from the branch 552 since the last merge from merge base 530 to node 510.

Figure 6:
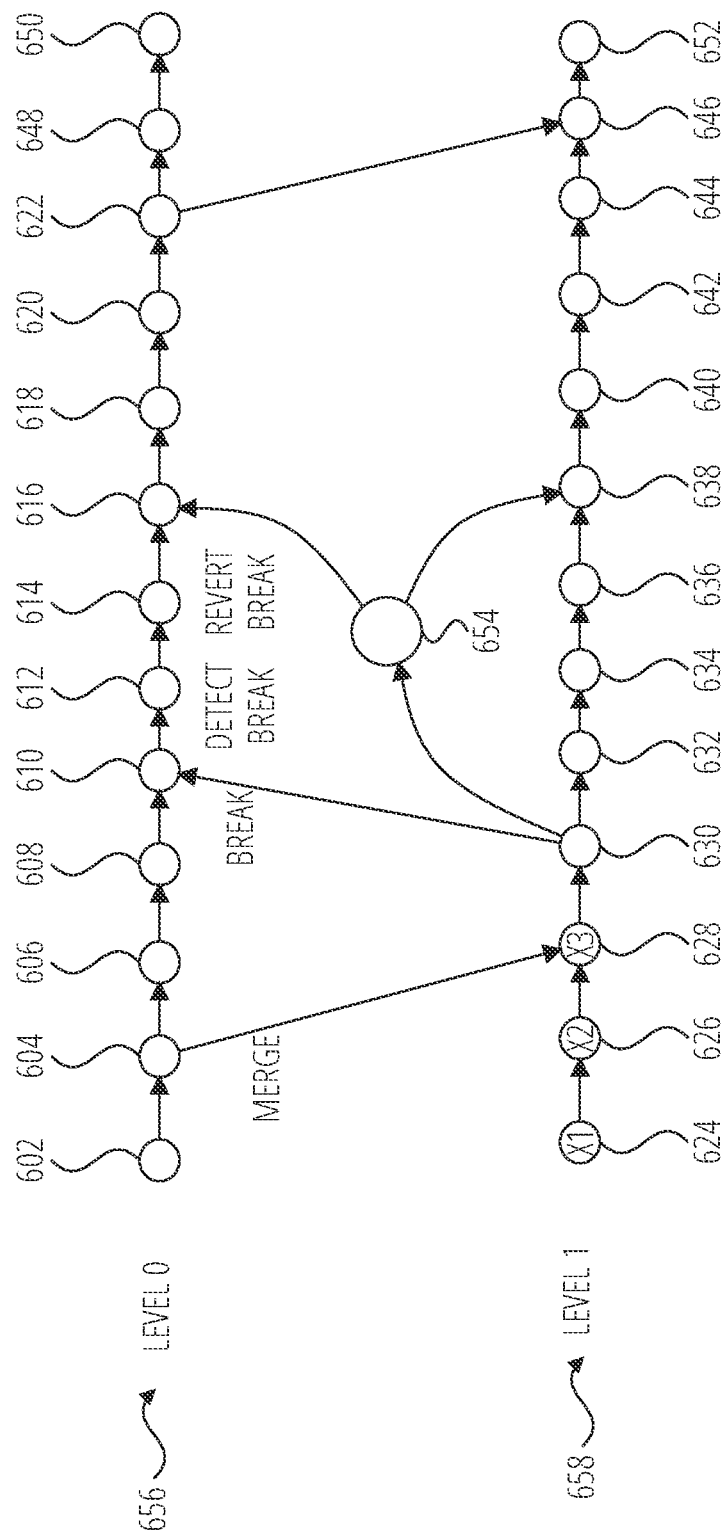
FIG. 6 illustrates an example of safe merges in accordance with one example embodiment.

FIG. 6 illustrates an example of safe merges in accordance with one example embodiment. Level 0 represents a 656 of a tree. Level 1 represents a branch 658 of the tree. Each node of the tree represents a revision of a source code within the respective trunk 656 or branch 658. For example, the trunk 656 includes changes 602, 604, 606, 608, 610, 612, 614, 616, 618, 620, 622, 648, and 650. The branch 658 includes changes 624, 626, 628, 630, 632, 634, 636, 638, 640, 642, 644, 646, and 652.

The source code from merge base 604 from trunk 656 is merged with node 628 of the branch 658. The node 628 includes previous source code changes (e.g., revision x1 at node 524, revision x2 at node 626, revision x3 at node 628) that are merged with source code from merge base 604.

The merge base 630 of the branch 658 merges back with node 610 resulting in a break (malfunction) of the source code at node 610. The break is detected at node 612. At node 614, a revert commit of the merge (from merge base 630 to node 610) is performed to remove the changes of merge base 630 to the trunk 656.

The revert commit detector module 202 detects the revert commit performed at node 614. In another example, the revert commit detector module 202 detects a merge from the branch 658 back to the trunk 656 (e.g., merge from merge base 630 to node 610). In response to the branch-to-trunk merge, the merge base patch branch module 204 forms a new branch (e.g. merge base patch branch 654) off the merge base 630. The merge base patch branch 654 includes a copy of the source code from the last node being merged from the trunk 656 to the branch 658: merge base 604. As such, merge base patch branch 654 is a child of merge base 630. The merge base patch branch 654 connects back to node 616 of trunk 656 and node 638 of branch 658.

In another example, the revert commit detector module 202 detects the merge from merge base 630 to node 610 and in response, the merge base patch branch module 204 forms the merge base patch branch 654. In yet another example, the revert commit detector module 202 detects a revert commit operation at node 614 and in response, the merge base patch branch module 204 forms the merge base patch branch 654. In yet another example, the revert commit detector module 202 detects a break at node 612 and in response, the merge base patch branch module 204 forms the merge base patch branch 654.

A later merge, after the node 614, from the trunk 656 to branch 658 is performed. For example, source code from parent 622 is merged with node 646. The merge base patch branch 654 is chosen as the merge base. As the child of merge base 630, and as an ancestor of both parent 622 and node 646, merge base patch branch 654 is picked as the merge base for the next merge (e.g., parent 622 to node 646). The next merge will logically function as if the merge base 604 was chosen as the merge base, preventing the above-described "unintentional backout" scenario (acting as if a defective merge did not occur).

Figure 7:
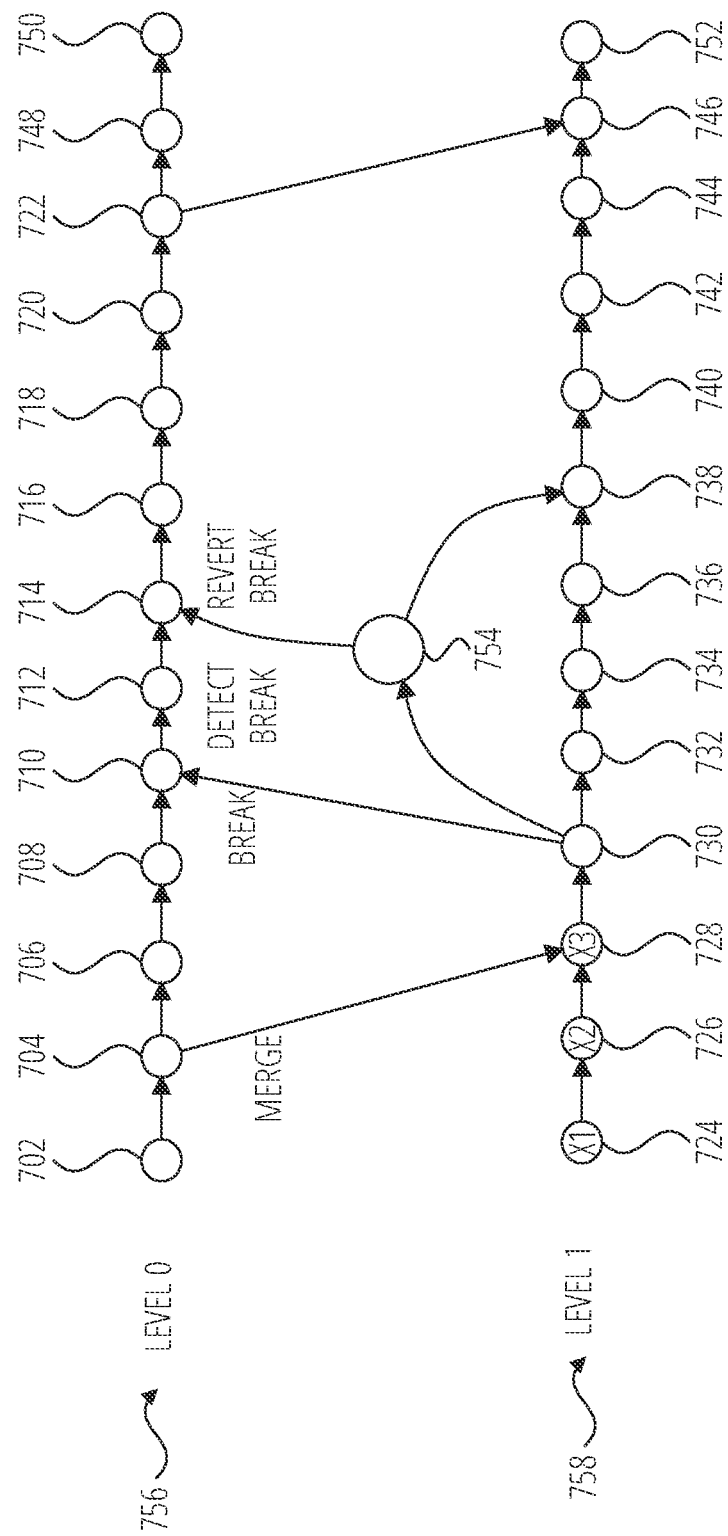
FIG. 7 illustrates an example of safe merges in accordance with one example embodiment.

FIG. 7 illustrates an example of safe merges in accordance with one example embodiment. Level 0 represents a 756 of a tree. Level 1 represents a branch 758 of the tree. Each node of the tree represents a revision of a source code within the respective trunk 756 or branch 758. For example, the trunk 756 includes changes 702, 704, 706, 708, 710, 712, 714, 716, 718, 720, 722, 748, and 750. The branch 758 includes changes 724, 726, 728, 730, 732, 734, 736, 738, 740, 742, 744, 746, and 752.

The source code from merge base 704 from trunk 756 is merged with node 728 of the branch 758. The node 728 includes previous source code changes (e.g., revision x1 at node 524, revision x2 at node 726, revision x3 at node 728) that are merged with source code from merge base 704.

The merge base 730 of the branch 758 merges back with node 710 resulting in a break (malfunction) of the source code at node 710. The break is detected at node 712. At node 714, a revert commit of the merge (from merge base 730 to node 710) is performed to remove the changes of merge base 730 to the trunk 756.

The revert commit detector module 202 detects the revert commit performed at node 714. In another example, the revert commit detector module 202 detects a merge from the branch 758 back to the trunk 756 (e.g., merge from merge base 730 to node 710). In response to the branch-to-trunk merge, the merge base patch branch module 204 forms a new branch (e.g. merge base patch branch 754) off the merge base 730. The merge base patch branch 754 includes a copy of the source code from the last node being merged from the trunk 756 to the branch 758: merge base 704. As such, merge base patch branch 754 is a child of merge base 730. The merge base patch branch 754 connects back to node 714 of trunk 756 and node 738 of branch 758.

A later merge, after the node 714, from the trunk 756 to branch 758 is performed. For example, source code from parent 722 is merged with node 746. The merge base patch branch 754 is chosen as the merge base. As the child of merge base 730, and as an ancestor of both parent 722 and node 746, merge base patch branch 754 is picked as the merge base for the next merge (e.g., parent 722 to node 746). The next merge will logically function as if the merge base 704 was chosen as the merge base, preventing the above-described "unintentional backout" scenario (acting as if a defective merge did not occur).

Figure 8:
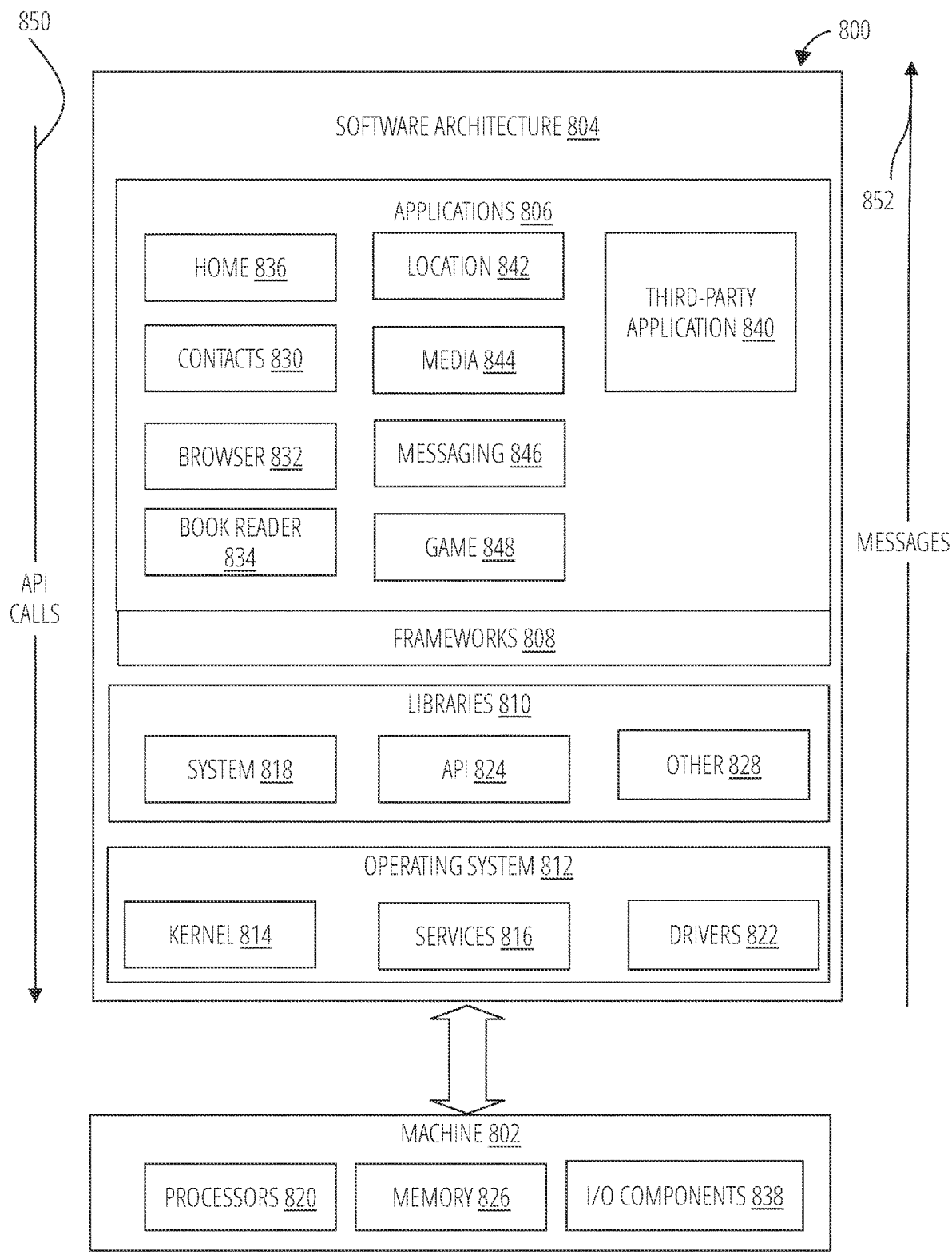
FIG. 8 is block diagram showing a software architecture within which the present disclosure may be implemented, according to an example embodiment.

FIG. 8 is a block diagram 800 illustrating a software architecture 804, which can be installed on any one or more of the devices described herein. The software architecture 804 is supported by hardware such as a machine 802 that includes Processors 820, memory 826, and I/O Components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, Processor management (e.g., scheduling), Component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Figure 9:
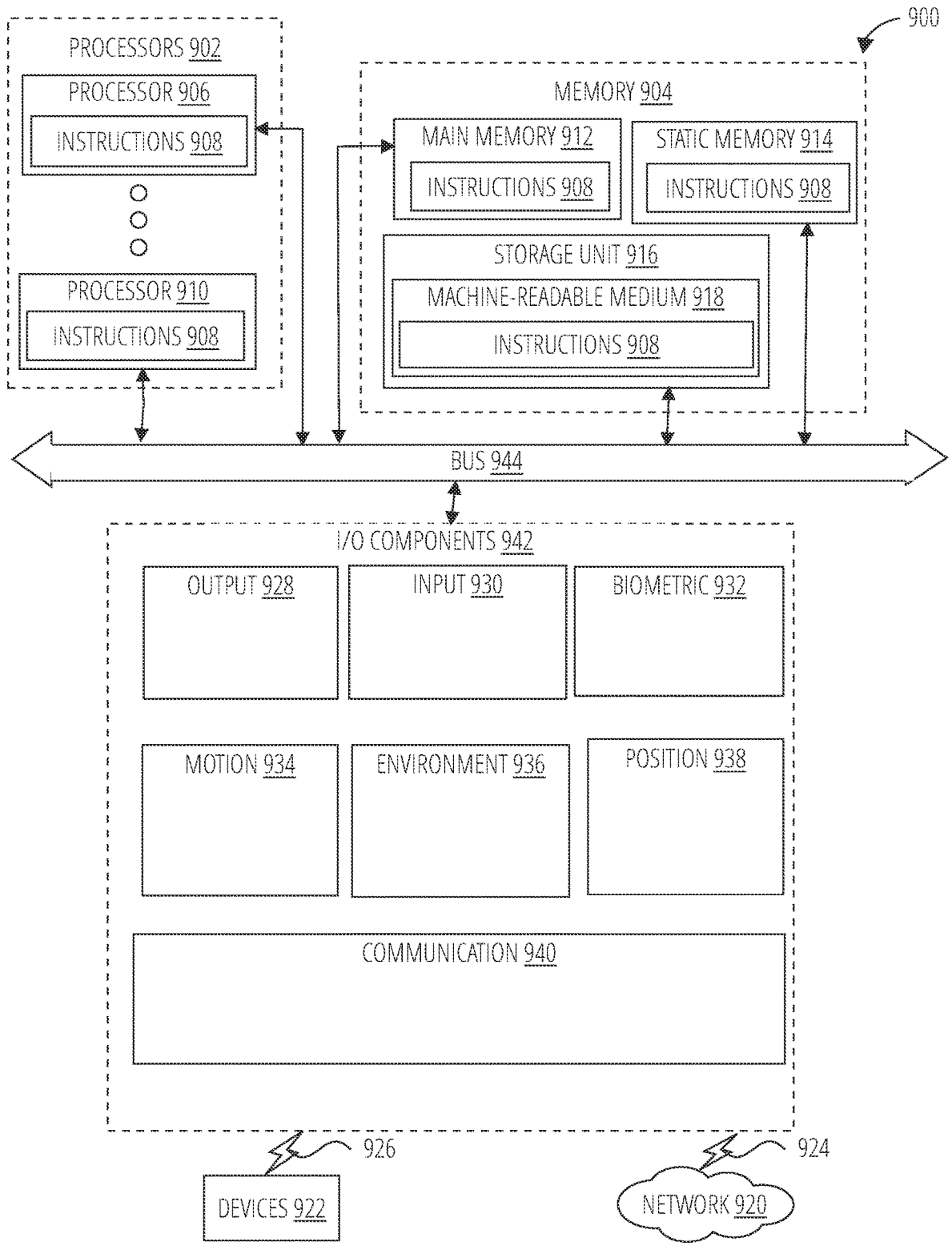
FIG. 9 is a diagrammatic representation of a machine in the form of a computer system within which a set of instructions may be executed for causing the machine to perform any one or more of the methodologies discussed herein, according to an example embodiment.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a stand-alone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include Processors 902, memory 904, and I/O Components 942, which may be configured to communicate with each other via a bus 944. In an example embodiment, the Processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 906 and a Processor 910 that execute the instructions 908. The term "Processor" is intended to include multi-core Processors that may comprise two or more independent Processors (sometimes referred to as "cores") that may execute instructions contemporaneously. Although FIG. 9 shows multiple Processors 902, the machine 900 may include a single Processor with a single core, a single Processor with multiple cores (e.g., a multi-core Processor), multiple Processors with a single core, multiple Processors with multiples cores, or any combination thereof.

The memory 904 includes a main memory 912, a static memory 914, and a storage unit 916, both accessible to the Processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the Processors 902 (e.g., within the Processor's cache memory), or any suitable combination thereof, during execution thereof by the machine 900.

The I/O Components 942 may include a wide variety of Components to receive input, provide output, produce output, transmit information, exchange information, capture measurements, and so on. The specific I/O Components 942 that are included in a particular machine will depend on the type of machine. For example, portable machines such as mobile phones may include a touch input device or other such input mechanisms, while a headless server machine will likely not include such a touch input device. It will be appreciated that the I/O Components 942 may include many other Components that are not shown in FIG. 9. In various example embodiments, the I/O Components 942 may include output Components 928 and input Components 930. The output Components 928 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 930 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 942 may include biometric Components 932, motion Components 934, environmental Components 936, or position Components 938, among a wide array of other Components. For example, the biometric Components 932 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 934 include acceleration sensor Components (e.g., accelerometer), gravitation sensor Components, rotation sensor Components (e.g., gyroscope), and so forth. The environmental Components 936 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 938 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 942 further include communication Components 940 operable to couple the machine 900 to a network 920 or devices 922 via a coupling 924 and a coupling 926, respectively. For example, the communication Components 940 may include a network interface Component or another suitable device to interface with the network 920. In further examples, the communication Components 940 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 922 may be another machine or any of a wide variety of peripheral devices (e.g., a peripheral device coupled via a USB).

Moreover, the communication Components 940 may detect identifiers or include Components operable to detect identifiers. For example, the communication Components 940 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, and/or memory of the Processors 902) and/or storage unit 916 may store one or more sets of instructions and data structures (e.g., software) embodying or used by any one or more of the methodologies or functions described herein. These instructions (e.g., the instructions 908), when executed by Processors 902, cause various operations to implement the disclosed embodiments.

The instructions 908 may be transmitted or received over the network 920, using a transmission medium, via a network interface device (e.g., a network interface Component included in the communication Components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Examples

Example 1 is a computer-implemented method comprising: identifying a first merge base at a trunk, the first merge base merging with a branch of the trunk; identifying, at the branch, a second merge base, subsequent to the first merge base, the second merge base merging with the trunk; forming a merge base patch branch from the branch at the second merge base, the merge base patch branch including a copy of the first merge base; merging the merge base patch branch with the trunk; and merging the merge base patch branch with the branch.

Example 2 includes example 1, further comprising: performing a merge function of the trunk with the branch after merging the merge base patch branch with the trunk, wherein the merge function identifies the merge base patch branch as a common ancestor to both the trunk and the branch.

Example 3 includes example 1, further comprising: detecting a break at the trunk in response to the second merge base merging with the trunk; and performing a revert commit function at the trunk in response to detecting the break.

Example 4 includes example 3, further comprising: merging the trunk with the branch after merging the merge base patch branch with the trunk.

Example 5 includes example 4, further comprising: fixing the branch in response detecting the break at the trunk; and merging the fixed branch with the trunk.

Example 6 includes example 3, wherein merging the merge base patch branch with the trunk further comprises: merging the merge base patch branch at the revert commit function at the trunk.

Example 7 includes example 1, wherein the trunk includes a sequence of source code revisions to an application.

Example 8 includes example 1, wherein the branch of the trunk includes a sequence of source code revisions to a subset application of the application.

Example 9 includes example 1, wherein the trunk and the branch are part of a tree of a version control system.

Example 10 includes example 9, wherein the version control system does not allow for shared history to be rewritten.

Example 11 is a computing apparatus comprising: a processor; and a memory storing instructions that, when executed by the processor, configure the apparatus to: identify a first merge base at a trunk, the first merge base merging with a branch of the trunk; identify, at the branch, a second merge base, subsequent to the first merge base, the second merge base merging with the trunk; form a merge base patch branch from the branch at the second merge base, the merge base patch branch including a copy of the first merge base; merge the merge base patch branch with the trunk; and merge the merge base patch branch with the branch.

Example 12 includes example 11, wherein the instructions further configure the apparatus to: perform a merge function of the trunk with the branch after merging the merge base patch branch with the trunk, wherein the merge function identifies the merge base patch branch as a common ancestor to both the trunk and the branch.

Example 13 includes example 11, wherein the instructions further configure the apparatus to: detect a break at the trunk in response to the second merge base merging with the trunk; and perform a revert commit function at the trunk in response to detecting the break.

Example 14 includes example 13, wherein the instructions further configure the apparatus to: merge the trunk with the branch after merging the merge base patch branch with the trunk.

Example 15 includes example 14, wherein the instructions further configure the apparatus to: fix the branch in response detecting the break at the trunk; and merge the fixed branch with the trunk.

Example 16 includes example 13, wherein merging the merge base patch branch with the trunk further comprises: merge the merge base patch branch at the revert commit function at the trunk.

Example 17 includes example 11, wherein the trunk includes a sequence of source code revisions to an application.

Example 18 includes example 11, wherein the branch of the trunk includes a sequence of source code revisions to a subset application of the application.

Example 19 includes example 11, wherein the trunk and the branch are part of a tree of a version control system, wherein the version control system does not allow for shared history to be rewritten.

Example 20 includes a non-transitory computer-readable storage medium, the computer-readable storage medium including instructions that when executed by a computer, cause the computer to: identify a first merge base at a trunk, the first merge base merging with a branch of the trunk; identify, at the branch, a second merge base, subsequent to the first merge base, the second merge base merging with the trunk; form a merge base patch branch from the branch at the second merge base, the merge base patch branch including a copy of the first merge base; merge the merge base patch branch with the trunk; and merge the merge base patch branch with the branch.

What is claimed is:

1. A computer-implemented method, comprising:
    identifying a first merge base at a trunk, the first merge base merging with a first node of a branch of the trunk;
    identifying, at the branch, a second merge base, subsequent to the first node of the branch and the first merge base, the second merge base merging with the trunk;
    detecting merging of the second merge base with a second node of the trunk, the second node subsequent to the first merge base of the trunk;
    in response to detecting the merging of the second merge base with the second node of the trunk, forming a merge base patch branch from the second merge base, the merge base patch branch including a copy of the first merge base;
    merging the merge base patch branch with the trunk; and
    merging the merge base patch branch with the branch.

2. The computer-implemented method of claim 1, further comprising:
    performing a merge function of the trunk with the branch after merging the merge base patch branch with the trunk, wherein the merge function identifies the merge base patch branch as a common ancestor to both the trunk and the branch.

3. The computer-implemented method of claim 1, further comprising:
    detecting a break at the trunk in response to the second merge base merging with the trunk; and
    performing a revert commit function at the trunk in response to detecting the break.

4. The computer-implemented method of claim 3, further comprising:
    merging the trunk with the branch after merging the merge base patch branch with the trunk.

5. The computer-implemented method of claim 4, further comprising:
    fixing the branch in response detecting the break at the trunk; and
    merging the fixed branch with the trunk.

6. The computer-implemented method of claim 3, wherein merging the merge base patch branch with the trunk further comprises:
    merging the merge base patch branch at the revert commit function at the trunk.

7. The computer-implemented method of claim 1, wherein the trunk includes a sequence of source code revisions to an application.

8. The computer-implemented method of claim 1, wherein the branch of the trunk includes a sequence of source code revisions to a subset application of the application.

9. The computer-implemented method of claim 1, wherein the trunk and the branch are part of a tree of a version control system.

10. The computer-implemented method of claim 9, wherein the version control system does not allow for shared history to be rewritten.

11. A computing apparatus comprising:
    a processor; and
    a memory storing instructions that, when executed by the processor, configure the apparatus to:
    identify a first merge base at a trunk, the first merge base merging with a first node of a branch of the trunk;
    identify, at the branch, a second merge base, subsequent to the first node of the branch and the first merge base, the second merge base merging with the trunk;
    detect merging of the second merge base with a second node of the trunk, the second node subsequent to the first merge base of the trunk;
    in response to detecting the merging of the second merge base with the second node of the trunk, forming a merge base patch branch from the second merge base, the merge base patch branch including a copy of the first merge base;
    merge the merge base patch branch with the trunk; and
    merge the merge base patch branch with the branch.

12. The computing apparatus of claim 11, wherein the instructions further configure the apparatus to:
    perform a merge function of the trunk with the branch after merging the merge base patch branch with the trunk, wherein the merge function identifies the merge base patch branch as a common ancestor to both the trunk and the branch.

13. The computing apparatus of claim 11, wherein the instructions further configure the apparatus to:
    detect a break at the trunk in response to the second merge base merging with the trunk; and
    perform a revert commit function at the trunk in response to detecting the break.

14. The computing apparatus of claim 13, wherein the instructions further configure the apparatus to:
    merge the trunk with the branch after merging the merge base patch branch with the trunk.

15. The computing apparatus of claim 14, wherein the instructions further configure the apparatus to:
   fix the branch in response detecting the break at the trunk; and
   merge the fixed branch with the trunk.

16. The computing apparatus of claim 13, wherein merging the merge base patch branch with the trunk further comprises:
   merge the merge base patch branch at the revert commit function at the trunk.

17. The computing apparatus of claim 11, wherein the trunk includes a sequence of source code revisions to an application.

18. The computing apparatus of claim 11, wherein the branch of the trunk includes a sequence of source code revisions to a subset application of the application.

19. The computing apparatus of claim 11, wherein the trunk and the branch are part of a tree of a version control system, wherein the version control system does not allow for shared history to be rewritten.

20. A non-transitory computer-readable storage medium, the computer-readable storage medium including instructions that when executed by a computer, cause the computer to:
   identify a first merge base at a trunk, the first merge base merging with a first node of a branch of the trunk;
   identify, at the branch, a second merge base, subsequent to the first node of the branch and the first merge base, the second merge base merging with the trunk;
   detect merging of the second merge base with a second node of the trunk, the second node subsequent to the first merge base of the trunk;
   in response to detecting the merging of the second merge base with the second node of the trunk, forming a merge base patch branch from the second merge base, the merge base patch branch including a copy of the first merge base;
   merge the merge base patch branch with the trunk; and
   merge the merge base patch branch with the branch.

* * * * *